United States Patent
Saito et al.

(10) Patent No.: US 9,562,182 B2
(45) Date of Patent: *Feb. 7, 2017

(54) REFRIGERATOR WORKING FLUID COMPOSITION AND REFRIGERANT OIL

(71) Applicant: JX NIPPON OIL & ENERGY CORPORATION, Tokyo (JP)

(72) Inventors: Masanori Saito, Tokyo (JP); Fumiyuki Nara, Tokyo (JP); Tomonari Matsumoto, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 14/388,117

(22) PCT Filed: Mar. 27, 2013

(86) PCT No.: PCT/JP2013/059101
§ 371 (c)(1),
(2) Date: Sep. 25, 2014

(87) PCT Pub. No.: WO2013/146924
PCT Pub. Date: Oct. 3, 2013

(65) Prior Publication Data
US 2015/0115194 A1   Apr. 30, 2015

(30) Foreign Application Priority Data

Mar. 29, 2012 (JP) ................................. 2012-077011

(51) Int. Cl.
*C09K 5/04*  (2006.01)
*C10M 171/00*  (2006.01)
*C10M 169/04*  (2006.01)

(52) U.S. Cl.
CPC ............ *C09K 5/042* (2013.01); *C10M 169/04* (2013.01); *C10M 171/008* (2013.01); *C09K 2205/104* (2013.01); *C09K 2205/11* (2013.01); *C09K 2205/12* (2013.01); *C10M 2203/1006* (2013.01); *C10M 2203/1025* (2013.01); *C10M 2205/0285* (2013.01); *C10M 2205/223* (2013.01); *C10M 2207/0406* (2013.01); *C10M 2207/2805* (2013.01); *C10M 2207/289* (2013.01); *C10M 2207/2825* (2013.01); *C10M 2207/2835* (2013.01); *C10M 2207/301* (2013.01); *C10M 2209/043* (2013.01); *C10M 2209/1033* (2013.01); *C10M 2209/1055* (2013.01); *C10M 2223/041* (2013.01); *C10N 2220/022* (2013.01); *C10N 2220/303* (2013.01); *C10N 2230/06* (2013.01); *C10N 2230/10* (2013.01); *C10N 2230/70* (2013.01); *C10N 2240/30* (2013.01)

(58) Field of Classification Search
CPC .............. C09K 5/042; C09K 2205/12
See application file for complete search history.

(56) References Cited

U.S. PATENT DOCUMENTS

| 5,728,655 | A | 3/1998 | Muraki et al. |
| 7,758,768 | B2 | 7/2010 | Machado |
| 7,972,529 | B2 | 7/2011 | Machado |
| 9,243,177 | B2 * | 1/2016 | Saito ................. C10M 171/008 |
| 2003/0125219 | A1 * | 7/2003 | Tazaki ................. C10M 137/12 508/422 |
| 2007/0004605 | A1 | 1/2007 | Matsumura et al. |
| 2009/0072188 | A1 | 3/2009 | Machado |
| 2010/0249002 | A1 | 9/2010 | Machado |

FOREIGN PATENT DOCUMENTS

| CN | 1260824 A | 7/2000 |
| CN | 101228255 | 7/2008 |
| EP | 1 950 279 | 7/2008 |
| JP | 05-171174 | 7/1993 |
| JP | 6-9661 | 1/1994 |
| JP | 08-157847 | 6/1996 |
| JP | H9-1699991 A | 6/1997 |
| JP | 09-189453 | 7/1997 |
| JP | 11-349970 | 12/1999 |
| JP | 2000-136395 | 5/2000 |
| JP | 2001-226690 A | 8/2001 |
| JP | 2005-514492 A | 5/2005 |
| JP | 2005-325151 | 11/2005 |
| JP | 2008-546893 | 12/2008 |
| JP | 2009-235179 | 10/2009 |
| WO | 00/60031 | 10/2000 |

OTHER PUBLICATIONS

Extended European Search Report for EP 13769019.4, mailed May 18, 2015.
Office Action issued in Japan Patent Appl. No. 2012-077011, dated Aug. 4, 2015.
English translation of the International Search Report for PCT/JP2013/059101, which was mailed on Jul. 2, 2013.
Chinese Office Action for Application No. 201380016642.4, which was mailed on May 6, 2015.
English Translation of the International Preliminary Report of Patentability for Application No. PCT/JP2013/059101, which was mailed Oct. 9, 2014.
Taiwanese Office Action issued with respect to application No. 102111585, mail date is Aug. 2, 2016.
Japanese Office Action issued with respect to Application No. P2015-214166, mail date is Sep. 6, 2016.

* cited by examiner

*Primary Examiner* — John Hardee
(74) *Attorney, Agent, or Firm* — Greenblum and Bernstein, P.L.C.

(57) ABSTRACT

A working fluid composition for a refrigerating machine comprising: a refrigerating machine oil containing at least one lubricating base oil selected from a mineral oil and a synthetic oil, and at least one phosphorus compound selected from a mono(alkylphenyl) diphenyl phosphate having a C3-C5 alkyl group and a di(alkylphenyl) phenyl phosphate having two C3-C5 alkyl groups, wherein a content of the phosphorus compound is 0.01 to 5% by mass based on a total amount of the refrigerating machine oil; and a hydrocarbon refrigerant having 2 to 4 carbon atoms.

6 Claims, No Drawings

REFRIGERATOR WORKING FLUID COMPOSITION AND REFRIGERANT OIL

TECHNICAL FIELD

The present invention relates to a working fluid composition for a refrigerating machine and a refrigerating machine oil, and more particularly, it relates to a working fluid composition for a refrigerating machine and a refrigerating machine oil capable of retaining a low friction coefficient, having high wear resistance and contributing to reliability improvement and power saving.

BACKGROUND ART

As refrigerants for a cold storage chamber, a car air-conditioner, a room air-conditioner, an industrial refrigerator and the like, 1,1,1,2-tetrafluoroethane (R134a) of hydrofluorocarbon (HFC), R410A that is a mixed solvent of difluoroethane (R32) and pentafluoroethane (R125) in a mass ratio of 1/1, and the like are conventionally widely used.

The global warming potential (GWP) of such a HFC refrigerant is, however, as high as 1000 or more, and therefore, the use is now becoming restricted by the so-called F-gas regulation. It is indispensable for an alternative candidate for the HFC refrigerant to have a low GWP, and one of the candidates is a hydrocarbon refrigerant such as isobutane (R600a) already practically used for a cold storage chamber. Since the hydrocarbon refrigerant has an extremely low GWP of 20 or less and suitable physical properties, extensive studies are being made on it.

In the coexistence of a hydrocarbon refrigerant, since a hydrocarbon molecule does not contain chlorine or fluorine for increasing lubricity, lubricity improvement by the refrigerant cannot be expected differently from a case of the HFC refrigerant or the like, and in addition, since solubility of a hydrocarbon in a refrigerating machine oil is so high that the viscosity of the oil is lowered, a lubrication condition becomes severe, which requires a higher wear resistance of a refrigerating machine oil than in a conventional technique. Besides, from the viewpoint of power saving, it is required to also have a performance capable of retaining a friction coefficient low.

In the field of lubricating oils widely, an oiliness agent such as an alcohol, an ester or a long-chain fatty acid, an anti-wear agent such as a phosphoric acid ester or a metal dithiophosphate, and an extreme pressure agent such as an organic sulfur compound or an organic halogen compound are generally known as anti-wear additives. On the other hand, in a refrigerating machine oil, an additive cannot be used unless it is precipitated in the coexistence of a refrigerant and harmfully affects stability. Therefore, in a conventional refrigerating machine oil, an alcohol-based or ester-based oiliness agent, or triphenyl phosphate or tricresyl phosphate among phosphates is used.

Beside, Patent Literature 1 discloses a lubricating oil used for a refrigerating machine containing a phosphorus-based additive and a specific epoxy compound together, Patent Literature 2 discloses a compressor lubricating oil, to be used with the HFC refrigerant, containing triphenyl phosphate and tri(alkylphenyl) phosphate together, and Patent Literature 3 discloses a refrigerating machine oil, to be used with the ITC refrigerant, containing tricresyl phosphate and glycidyl ether epoxy or carbodiimide.

CITATION LIST

Patent Literature

Patent Literature 1: Japanese Patent Application Laid-Open No. 5-171174
Patent Literature 2: Japanese Patent Application Laid-Open No. 8-157847
Patent Literature 3: Japanese Patent Application Laid-Open No. 9-189453

SUMMARY OF INVENTION

Technical Problem

According to the studies by the present inventors, however, the refrigerating machine oils containing the aforementioned additives still have room for improvement as a refrigerating machine oil for a hydrocarbon refrigerant as follows.

First, among the above-described additives, an oiliness agent is used for forming a lubrication film by adsorption. Therefore, if a load condition is comparatively mild as in a mixed lubrication region, a low friction coefficient can be retained; but if the load condition becomes severe under the coexistence of a hydrocarbon refrigerant, the wear resistance effect is lost.

On the other hand, although triphenyl phosphate or tricresyl phosphate has the wear resistance effect, a friction coefficient becomes high, since it forms a hard film on the surface of a sliding portion, and therefore, it is not suitable for a refrigerating machine developed for power saving. In particular, in the coexistence of a hydrocarbon refrigerant friendly to the global environment, since the lubrication condition becomes severe as described above, an additive retaining not only high wear resistance but also a low friction coefficient is desired.

In consideration of the problems of the conventional techniques, and an object of the present invention is to provide a working fluid composition for a refrigerating machine and a refrigerating machine oil that can not only attain excellent wear resistance but also retain a sufficiently low friction coefficient even under a severe lubrication condition in the coexistence of a hydrocarbon refrigerant, and are excellent in power saving and long-term reliability.

Solution to Problem

The present inventors have found that when a specific phosphorus compound is added to a lubricating base oil, the wear resistance of a working fluid composition for a refrigerating machine and a refrigerating machine oil can be improved and a friction coefficient can be retained low without harmfully affecting other characteristics in the coexistence of a hydrocarbon refrigerant, resulting in accomplishing the present invention.

Specifically, the present invention provides a working fluid composition for a refrigerating machine comprising a refrigerating machine oil comprising at least one lubricating base oil selected from a mineral oil and a synthetic oil, and at least one phosphorus compound selected from a mono (alkylphenyl) diphenyl phosphate having a C3-C5 alkyl group and a di(alkylphenyl) phenyl phosphate having two C3-C5 alkyl groups, wherein a content of the phosphorus compound is 0.01 to 5% by mass based on a total amount of the refrigerating machine oil; and a hydrocarbon refrigerant having 2 to 4 carbon atoms.

It is preferred that the phosphorus compound is at least one selected from a mono(butylphenyl) diphenyl phosphate having a C4 alkyl group and a di(butylphenyl) phenyl phosphate having two C4 alkyl groups.

It is preferred that the lubricating base oil is at least one selected from a mineral oil, an alkylbenzene, a poly-α-olefin, an ester and an ether, and that a kinematic viscosity at 40° C. of the lubricating base oil is 3 to 500 mm²/s.

Furthermore, it is preferred that the lubricating base oil is at least one or more selected from a mineral oil, an alkyl benzene, a poly-α-olefin, a diester, a polyol ester, a complex ester, a polyalkylene glycol, a polyalkylene glycol compound and a polyvinyl ether, and that a kinematic viscosity at 40° C. of the lubricating base oil is 3 to 300 mm²/s.

It is preferred that the hydrocarbon refrigerant is at least one selected from propane (R290), propylene (R1270), normal-butane (R600) and isobutane (R600a).

Besides, the present invention provides a refrigerating machine oil comprising: at least one lubricating base oil selected from a mineral oil and a synthetic oil; and at least one phosphorus compound selected from a mono(alkylphenyl) diphenyl phosphate having a C3-C5 alkyl group and a di(alkylphenyl) phenyl phosphate having two C3-C5 alkyl groups, wherein a content of the phosphorus compound is 0.01 to 5% by mass based on a total amount of the refrigerating machine oil, and the refrigerating machine oil being used together with a hydrocarbon refrigerant having 2 to 4 carbon atoms.

Advantageous Effects of Invention

According to the present invention, a working fluid composition for a refrigerating machine and a refrigerating machine oil capable of exhibiting remarkable effects are provided, and specifically, a working fluid composition for a refrigerating machine and a refrigerating machine oil which can retain an wear resistance effect as well as a low friction coefficient even under a severe lubrication condition in the coexistence of a hydrocarbon refrigerant to achieve power saving, and can be stably used for a long period of time are provided.

DESCRIPTION OF EMBODIMENTS

Preferred embodiments of the present invention will now be described in detail.

First Embodiment

Refrigerating Machine Oil

A refrigerating machine oil according to first embodiment of the present invention contains: at least one lubricating base oil selected from a mineral oil and a synthetic oil; and at least one phosphorus compound selected from a mono (alkylphenyl) diphenyl phosphate having a C3-C5 alkyl group and a di(alkylphenyl) phenyl phosphate having two C3-C5 alkyl groups, and the content of the phosphorus compound is 0.01 to 5% by mass based on the total amount of the refrigerating machine oil. Such a refrigerating machine oil is used together with a hydrocarbon refrigerant having 2 to 4 carbon atoms.

The refrigerating machine oil of the present embodiment contains, as the lubricating base oil, at least one selected from a mineral oil and a synthetic oil.

As the mineral oil, any of a paraffin oil, a naphthene oil and a mixed base oil may be used. A refined lubricating oil fraction, which is obtained by subjecting a lubricating oil fraction, resulting from atmospheric pressure distillation and vacuum distillation of each of or a mixture of two or more of these mineral oils, to an appropriate combination of refining means for lubricating oils such as solvent deasphalting, solvent extraction, hydrogenation refining, hydro-cracking, solvent dewaxing, hydrogenation dewaxing, and a clay treatment, can be suitably used. One of refined lubricating oil fractions having different properties obtained from combinations of the respective materials and the respective refining means can be singly used, or two or more of them can be used in combination.

On the other hand, examples of a synthetic lubricating base oil include oxygen-containing compounds such as an ester and an ether, and hydrocarbon oils such as a poly-α-olefin (PAO), an ethylene-α-olefin oligomer, an alkylbenzene and an alkyl naphthalene.

Among the oxygen-containing compounds, as the ester, ester compounds having various molecular structures are commercially available, and the ester is a base oil having peculiar viscosity characteristic and low-temperature characteristic and characterized by a higher flash point than that of a hydrocarbon base oil with the same viscosity. The ester can be obtained by a dehydration condensation reaction of an alcohol and a fatty acid, and in the present invention, from the viewpoint of chemical stability, examples of a suitable base oil component include a diester of a dibasic acid and a monohydric alcohol, a polyol ester of a polyol (a neopentyl polyol in particular) and a monocarboxylic acid, and a complex ester of a polyol, a polybasic acid and a monohydric alcohol (or a monocarboxylic acid). Among these, a polyol ester excellent in stability is preferred.

Examples of the ether include a polyalkylene glycol and a polyvinyl ether. Examples of the polyalkylene glycol include polypropylene glycol, polyethylene glycol, and a copolymer of propylene oxide and ethylene oxide. With respect to an end structure, at least one end is preferably an alkyl group, and more preferably a methyl group from the viewpoint of the hygroscopicity. Besides, from the viewpoint of easy producing and cost, it is preferred that one of the ends is an alkyl group and the other is a hydrogen atom, and it is particularly preferred that one of the ends is a methyl group and the other is a hydrogen atom. With respect to a principal skeleton, a copolymer having an oxyethylene (EO) group and an oxypropylene (PO) group is preferred from the viewpoint of the lubricity, and a ratio of the oxyethylene group to the sum of the oxyethylene group and the oxypropylene group (EO/PO+EO) is preferably in a range of 0.1 to 0.8, and more preferably in a range of 0.3 to 0.6. Furthermore, from the viewpoint of the hygroscopicity and thermal/chemical stability, a value of EO/(PO+EO) is preferably in a range of 0 to 0.5, more preferably in a range of 0 to 0.2, and most preferably 0 (namely, a polymer of propylene oxide singly).

The polyvinyl ether has a structural unit represented by the following formula (1). The polyvinyl ether of the present embodiment may be a single polymer containing one and the same structural unit, or a copolymer containing two or more types of structural units, and the copolymer is preferred because the characteristics can be adjusted to be well balanced.

[Chemical Formula 1]

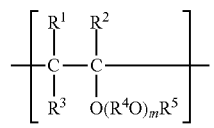

(1)

[R$^1$, R$^2$ and R$^3$ may be the same as or different from one another, and each represent a hydrogen atom or a hydrocarbon group having 1 to 8 carbon atoms, R$^4$ represents a bivalent hydrocarbon group having 1 to 10 carbon atoms or an etheral oxygen-containing bivalent hydrocarbon group having 2 to 20 carbon atoms, R$^5$ represents a hydrocarbon group having 1 to 20 carbon atoms, m represents a number for attaining an average of m in the entire polyvinyl ether of 0 to 10, R$^1$ to R$^5$ may be the same in or different among each structural units, and if m is 2 or more in one structural unit, a plurality of R$^4$O may be the same as or different from one another.]

Among the synthetic hydrocarbon oils, the poly-α-olefin (PAO) is a copolymer of α-olefin, and hence, its characteristics can be appropriately selected by selecting the degree of polymerization.

The alkylbenzene is divided into a linear type and a branched type depending on the structure of an alkyl group, and since these types have different characteristics, they are used selectively depending on the purpose.

In the present embodiment, one of the above-described mineral oils and synthetic oils may be singly used, or two or more of them may be used in combination.

The kinematic viscosity at 40° C. of the lubricating base oil is preferably 3 to 500 mm$^2$/s, more preferably 3 to 300 mm$^2$/s, and further more preferably 5 to 150 mm$^2$/s. The viscosity index of the lubricating base oil is preferably 10 or more. A kinematic viscosity at 40° C. and a viscosity index herein mean values measured in accordance with JIS K2283.

The pour point of the lubricating base oil is preferably −10° C. or less, and more preferably −20° C. or less. A pour point herein means a value measured in accordance with JIS K2269.

The flash point of the lubricating base oil is preferably 120° C. or more, and more preferably 200° C. or more. A flash point herein means a value measured in accordance with JIS K2265.

Furthermore, the refrigerating machine oil of the present embodiment contains at least one phosphorus compound selected from a mono(alkylphenyl) diphenyl phosphate having a C3-C5 alkyl group and a di(alkylphenyl) phenyl phosphate having two C3-C5 alkyl groups.

The phosphorus compound of the present embodiment can be represented by the following formula (2):

$$(R^6\text{-Ph})_n\text{-P}(=O)\text{-(Ph)}_{3-n} \qquad (2)$$

[R$^6$ represents an alkyl group having 3 to 5 carbon atoms, Ph represents a phenyl group, and n represents an integer of 1 or 2.]

If n is 1, the phosphorus compound represented by the above formula (2) is a mono(alkylphenyl) diphenyl phosphate having a C3-C5 alkyl group. Specific examples of the mono(alkylphenyl) diphenyl phosphate include isopropylphenyl diphenyl phosphate, tert.-butylphenyl diphenyl phosphate and n-butylphenyl diphenyl phosphate.

If n is 2, the phosphorus compound represented by the above formula (2) is a di(alkylphenyl) phenyl phosphate having two C3-C5 alkyl groups. Examples of the di(alkylphenyl) diphenyl phosphate include di(isopropylphenyl) phenyl phosphate, di(tert.-butylphenyl) phenyl phosphate and di(n-butylphenyl) phenyl phosphate.

In the formula (2), R$^6$ is preferably a butyl group from the viewpoint of the lubricity of the refrigerating machine oil. Examples of the butyl group include a normal-butyl group of the linear alkyl group, and a tert.-butyl group of the branched alkyl group. If the number of carbon atoms of R$^6$ is 2 or less, the friction coefficient is so high that the power saving is difficult to achieve. The present inventors presume that it is because a film of the phosphorus compound formed in a sliding portion becomes hard. On the other hand, if the number of carbon atoms of R$^6$ exceeds 5, the wear resistance effect becomes small. The present inventors presume that it is because the affinity of the phosphorus compound with the lubricating base oil becomes so large that the concentration of the phosphorus compound in the sliding portion is extremely lowered.

The content of the phosphorus compound is 0.01 to 5% by mass, and preferably 0.1 to 3% by mass based on the total amount of the refrigerating machine oil. If the content is less than the lower limit of this range, the effect to improve the lubricity cannot be exhibited. If the content exceeds the upper limit, the influence on the stability of the refrigerating machine oil and swelling or the like of an organic material used in a system is unavoidably increased.

The refrigerating machine oil of the present embodiment may contain only the lubricating base oil and the phosphorus compound, but it may further contain an additive such as an antioxidant, a friction modifier, a rust-preventive agent, a metal deactivator, or an antifoaming agent in order to further improve the performance as long as the object of the present invention is not impaired.

Examples of the antioxidant include a phenol compound such as di-tert.-butyl-p-cresol and an amine compound such as an alkyl diphenyl amine; examples of the friction modifier include an aliphatic amine, an aliphatic amide, an aliphatic imide, an alcohol, an ester, an acid phosphate amine salt and a phosphite amine salt; an example of the rust-preventive agent includes an ester or a partial ester of alkenyl succinic acid; an example of the metal deactivator includes a benzotriazole; and examples of the antifoaming agent include a silicone compound and an ester antifoaming agent.

The refrigerating machine oil of the present embodiment can be preferably used as a lubricating oil for a refrigerating machine in which a hydrocarbon refrigerant having 2 to 4 carbon atoms is used. Herein, if the refrigerating machine oil of the present embodiment is applied to a cold storage chamber in which isobutane is used as a refrigerant, it is also necessary to have a characteristic suitable to a motorized (hermetic) compressor, namely, a high electrical insulating property. Therefore, the refrigerating machine oil of the present embodiment preferably has, after adding an additive, a volume resistivity of 10$^9$ Ω·m or more. A volume resistivity herein means a value measured in accordance with JIS C2101. If an additive is used, the volume resistivity means a volume resistivity of the refrigerating machine oil attained after adding the additive thereto.

Second Embodiment

Working Fluid Composition for a Refrigerating Machine

A working fluid composition for a refrigerating machine according to second embodiment of the present invention contains a refrigerating machine oil that contains at least one lubricating base oil selected from a mineral oil and a synthetic oil and at least one phosphorus compound selected from a mono(alkylphenyl) diphenyl phosphate having a C3-C5 alkyl group and a di(alkylphenyl) phenyl phosphate having two C3-C5 alkyl groups, wherein the content of the phosphorus compound is 0.01 to 5% by mass based on the total amount of the refrigerating machine oil; and a hydrocarbon refrigerant having 2 to 4 carbon atoms. The refrigerating machine oil contained in the working fluid composition for a refrigerating machine of the present embodiment is the same as the refrigerating machine oil according to first embodiment described above, and hence redundant description will be herein omitted.

Specific examples of the hydrocarbon refrigerant having 2 to 4 carbon atoms of the present embodiment include ethane, propane, n-butane and isobutane. In particular, a hydrocarbon refrigerant such as isobutane (R600a) which has been used for a cold storage chamber, and propane (R290) which has been examined for practical use for a room air-conditioner can be suitably used in the present embodiment. Particularly, the working fluid composition for a refrigerating machine of the present embodiment can achieve the power saving by lowering the viscosity of the refrigerating machine oil, and therefore is suitable to be used for a cold storage chamber in which a reciprocating compressor, where this effect is largely shown, is mainly used, and more particularly, is suitable to be used for an isobutane refrigerant.

In the working fluid composition for a refrigerating machine of the present embodiment, a content ratio between the refrigerant and the refrigerating machine oil is not especially limited, and the refrigerant/the refrigerating machine oil is preferably 10/90 to 90/10, and more preferably 30/70 to 70/30.

EXAMPLES

The present invention will now be described in more details by way of examples and comparative examples, and it is noted that the present invention is not limited to the following examples.

Examples 1 to 8 and Comparative Examples 1 to 6

In Examples 1 to 8 and Comparative Examples 1 to 6, the following lubricating base oils and additives were used for preparing refrigerating machine oils respectively having compositions shown in Tables 1 to 4.

(A) Lubricating Base Oil
A1: Ester of pentaerythritol and mixed acid of 2-ethyl hexanoic acid and 3,5,5-trimethyl hexanoic acid (in a mass ratio of 1:1) (having a kinematic viscosity at 40° C. of 68.0 mm$^2$/s, a viscosity index of 90, a pour point of −40° C. and a flash point of 260° C.)
A2: Dioctyl sebacate (having a kinematic viscosity at 40° C. of 11.6 mm$^2$/s, a viscosity index of 150, a pour point of −50° C. and a flash point of 220° C.)
A3: Polyoxypropylene having both ends ether-blocked with a methyl group (having an average molecular weight of 1000, a kinematic viscosity at 40° C. of 46.0 mm$^2$/s, a viscosity index of 190, a pour point of −45° C. and a flash point of 218° C.)
A4: Paraffin refined mineral oil (having a kinematic viscosity at 40° C. of 22.0 mm$^2$/s, a viscosity index of 95, a pour point of −15° C. and a flash point of 210° C.)
A5: Linear alkylbenzene (having a kinematic viscosity at 40° C. of 8.1 mm$^2$/s, a viscosity index of 45, a pour point of −50° C. and a flash point of 154° C.)

(B) Phosphorus compound represented by formula (2)
B1: Mono(n-butylphenyl) diphenyl phosphate
B2: Di(isopropylphenyl) phenyl phosphate
B3: Mixture of mono(tert.-butylphenyl) diphenyl phosphate/di(tert.-butylphenyl) phenyl phosphate=65/35 (in a mass ratio)

(C) Another additive
C1: Oiliness agent: glycerol monooleate (GMO)
C2: Anti-wear agent: triphenyl phosphate (TPP)
C3: Anti-wear agent: tricresyl phosphate (TCP)

Next, the refrigerating machine oils of Examples 1 to 8 and Comparative Examples 1 to 6 were used for performing the following lubricity test and thermal stability test:

(Lubricity Test)

A friction and wear test was performed by using a Falex block-on-ring friction and wear tester of ASTM D-2714-88 with a block test piece of alloy tool steel SKS3 (JIS G4404) and a ring test piece of nickel-chrome molybdenum steel SNCM220 (JIS G4103) under test conditions of a load of 300 N, a peripheral speed at 0.1 m/s, a temperature at 50° C. and a test time: 30 min. The amount of a sample oil was 100 ml, and for simulating dilution with a hydrocarbon refrigerant, 20 ml of normal-decane, which is a hydrocarbon not gasifying, was added to dilute the sample oil into a total sample amount of 120 ml.

As the test results, a value of a friction coefficient when stabilizing in a latter half of the test (about 25 min) is shown as the friction coefficient, and an wear width (mm) on the block measured after the test with a microscope having a scale is shown as the result of the wear test. The obtained results are shown in Tables 1 to 4.

(Thermal Stability Test)

Ninety grams of each sample oil having been adjusted to a moisture content of 100 ppm or less was weighed out in an autoclave, and a catalyst (a wire of iron, copper or aluminum, all having an outer diameter of 1.6 mm×50 mm) and 10 g of an isobutane refrigerant were sealed therein. The resultant was heated to 175° C., and after 100 hours, the appearance and an acid value (JIS C2100) of the sample oil were measured. The obtained results are shown in Tables 1 to 4. Incidentally, before the thermal stability test, the acid value of all the sample oils (fresh oils) was 0.01 mgKOH/g.

TABLE 1

| | Item | Example 1 | Example 2 | Example 3 | Example 4 |
|---|---|---|---|---|---|
| Base oil | Type | A1 | A1 | A2 | A3 |
| | Content, mass % | 99.5 | 99.0 | 98.0 | 97.0 |
| Additive | B1, mass % | 0.5 | — | — | 3.0 |
| | B2, mass % | — | 1.0 | — | — |
| | B3, mass % | — | — | 2.0 | — |
| Lubricity | Friction coefficient | 0.12 | 0.13 | 0.13 | 0.13 |
| | Wear width, mm | 0.51 | 0.53 | 0.43 | 0.41 |
| Thermal stability | Appearance of oil | No precipitation | No precipitation | No precipitation | No precipitation |
| | Acid value, mgKOH/g | 0.01 | 0.01 | 0.01 | 0.01 |

TABLE 2

| | Item | Example 5 | Example 6 | Example 7 | Example 8 |
|---|---|---|---|---|---|
| Base oil | Type | A4 | A4 | A4 | A5 |
| | Content, mass % | 99.9 | 99.5 | 99.0 | 99.5 |
| Additive | B1, mass % | 0.1 | — | — | — |
| | B2, mass % | — | 0.5 | — | — |
| | B3, mass % | — | — | 1.0 | 0.5 |
| Lubricity | Friction coefficient | 0.13 | 0.14 | 0.14 | 0.13 |
| | Wear width, mm | 0.53 | 0.55 | 0.54 | 0.56 |
| Thermal stability | Appearance of oil | No precipitation | No precipitation | No precipitation | No precipitation |
| | Acid value, mgKOH/g | 0.01 | 0.01 | 0.01 | 0.01 |

TABLE 3

| | Item | Comparative Example 1 | Comparative Example 2 | Comparative Example 3 |
|---|---|---|---|---|
| Base oil | Type | A1 | A1 | A3 |
| | Content, mass % | 100 | 99.0 | 98.0 |
| Additive | C1, mass % | — | 1.0 | — |
| | C2, mass % | — | — | 2.0 |
| | C3, mass % | — | — | — |
| Lubricity | Friction coefficient | 0.16 | 0.13 | 0.18 |
| | Wear width, mm | 0.88 | 0.70 | 0.50 |
| Thermal stability | Appearance of oil | No precipitation | No precipitation | No precipitation |
| | Acid value, mgKOH/g | 0.01 | 0.01 | 0.01 |

TABLE 4

| | Item | Comparative Example 4 | Comparative Example 5 | Comparative Example 6 |
|---|---|---|---|---|
| Base oil | Type | A4 | A4 | A5 |
| | Content, mass % | 99.9 | 99.0 | 99.5 |
| Additive | C1, mass % | 0.1 | — | — |
| | C2, mass % | — | 1.0 | — |
| | C3, mass % | — | — | 0.5 |
| Lubricity | Friction coefficient | 0.12 | 0.17 | 0.6 |
| | Wear width, mm | 0.72 | 0.55 | 0.58 |
| Thermal stability | Appearance of oil | No precipitation | No precipitation | No precipitation |
| | Acid value, mgKOH/g | 0.01 | 0.01 | 0.01 |

As shown in Tables 1 and 2, the refrigerating machine oils of Examples 1 to 8 showed results of smaller friction coefficients and smaller wear widths as compared with the refrigerating machine oil of Comparative Example 1.

Next, through comparison between Examples 1 to 8 and Comparative Examples 2 and 4, the wear width which is an index of the wear was much larger in Comparative Examples 2 and 4. This result supports that the oiliness agent of the adsorption type can attain a friction coefficient at a given level but is inferior in the wear resistance.

Besides, through comparison between Examples 1 to 8 and Comparative Examples 3, 5 and 6, the friction coefficient was higher by about 20% in Comparative Examples 3, 5 and 6 than in Examples 1 to 8. This is a significant difference from the viewpoint of the power saving of a refrigerating machine compressor.

It is understood from these results that each of the refrigerating machine oils of Examples 1 to 8 is a refrigerating machine oil that has good stability, has, with respect to the lubricity, high wear resistance even if diluted with a hydrocarbon, and can retain a friction coefficient low.

INDUSTRIAL APPLICABILITY

In the movement toward replacing a refrigerant for a refrigerating machine with one having a lower global warming potential, i.e., a lower GWP, due to the regulation against the currently used HFC refrigerants, even in use together with a hydrocarbon refrigerant, that is, one of alternative candidates for the HFC refrigerants, the refrigerating machine oil of the present invention can be suitably used as an oil capable of power saving and having long-term reliability, because of its high wear resistance and the characteristic capable of retaining a friction coefficient low, in a cold storage chamber, a room air-conditioner, a general industrial refrigerator and the like, part of which already practically use a hydrocarbon refrigerant.

The invention claimed is:

1. A working fluid composition for a refrigerating machine comprising:
    a refrigerating machine oil comprising at least one lubricating base oil selected from a mineral oil and a synthetic oil, and at least one phosphorus compound selected from a mono(alkylphenyl) diphenyl phosphate having a C3-C5 alkyl group and a di(alkylphenyl) phenyl phosphate having two C3-C5 alkyl groups, wherein a content of the phosphorus compound is 0.01 to 5% by mass based on a total amount of the refrigerating machine oil; and
    a hydrocarbon refrigerant having 2 to 4 carbon atoms.

2. The working fluid composition for a refrigerating machine according to claim 1, wherein the phosphorus compound is at least one selected from a mono(butylphenyl) diphenyl phosphate having a C4 alkyl group and a di(butylphenyl) phenyl phosphate having two C4 alkyl groups.

3. The working fluid composition for a refrigerating machine according to claim 1, wherein the lubricating base oil has a kinematic viscosity at 40° C. of 3 to 500 mm$^2$/s and is at least one selected from a mineral oil, an alkylbenzene, a poly-α-olefin, an ester, and an ether.

4. The working fluid composition for a refrigerating machine according to claim 1, wherein the lubricating base oil has a kinematic viscosity at 40° C. of 3 to 300 mm$^2$/s and is at least one selected from a mineral oil, an alkyl benzene, a poly-α-olefin, a diester, a polyol ester, a complex ester, a polyalkylene glycol, a polyalkylene glycol compound, and a polyvinyl ether.

5. The working fluid composition for a refrigerating machine according to claim 1, wherein the hydrocarbon refrigerant is at least one selected from propane, propylene, normal-butane and isobutane.

6. A refrigerating machine oil comprising:
at least one lubricating base oil selected from a mineral oil and a synthetic oil; and
at least one phosphorus compound selected from a mono (alkylphenyl) diphenyl phosphate having a C3-C5 alkyl group and a di(alkylphenyl) phenyl phosphate having two C3-C5 alkyl groups, wherein a content of the phosphorus compound is 0.01 to 5% by mass based on a total amount of the refrigerating machine oil,
the refrigerating machine oil being used together with a hydrocarbon refrigerant having 2 to 4 carbon atoms.

* * * * *